Aug. 10, 1943.     T. A. RICH     2,326,252
GALVANOMETER
Filed Jan. 2, 1941
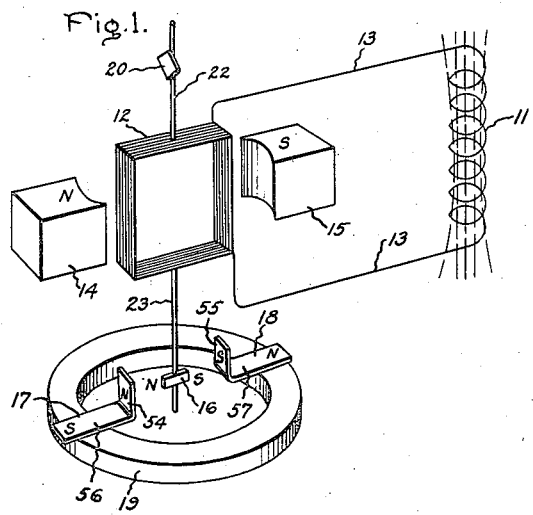
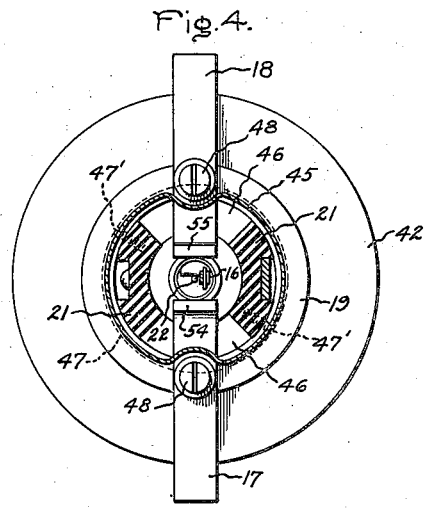
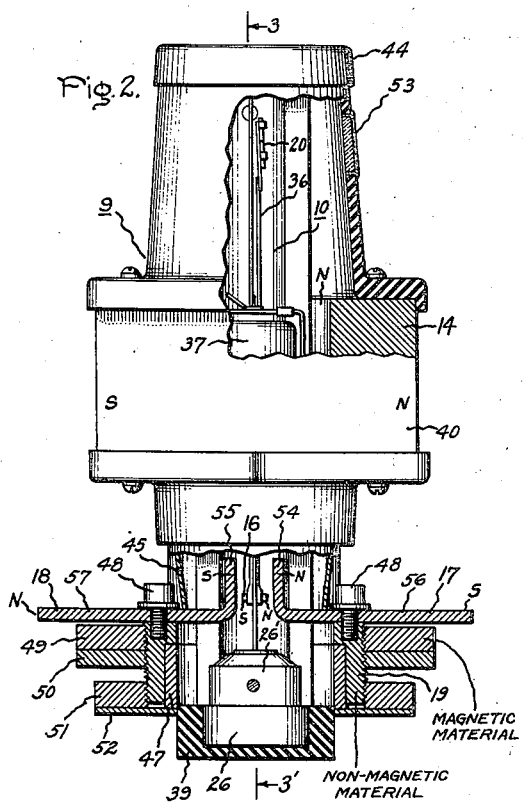
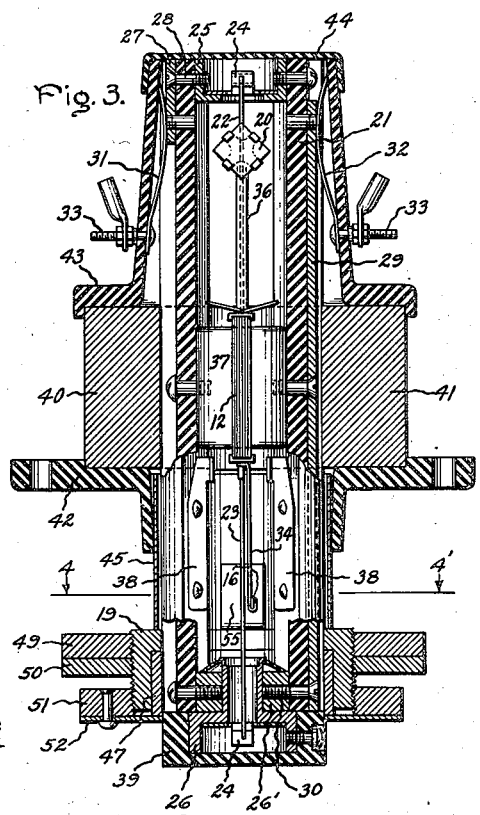
Inventor:
Theodore A. Rich,
by Harry E. Dunham
His Attorney.

Patented Aug. 10, 1943

2,326,252

UNITED STATES PATENT OFFICE 2,326,252

GALVANOMETER

Theodore A. Rich, Schenectady, N. Y., assignor to General Electric Company, a corporation of New York Application January 2, 1941, Serial No. 372,778

9 Claims. (Cl. 171—95)

My invention relates to deflecting instruments, particularly current-responsive instruments such as galvanometers.

It is an object of my invention to provide a rugged, yet highly sensitive deflecting instrument or galvanometer, in which a sturdy suspension or support for the movable element may be employed and the inherent restraining torque thereof is compensated to produce an instrument which will deflect in response to very minute forces or measured quantities. A further object of my invention is to provide a readily portable rugged yet sensitive flux meter which will give accurate indications with substantially no drifting. Other and further objects and advantages will become apparent as the description proceeds.

In carrying out my invention in its preferred form, I utilize a galvanometer unit of the type, which has been used in a sturdy class of galvanometers in which there is a rotatable coil supported by a wire suspension of sufficient strength to make it unnecessary to block the rotatable coil during shipment of the galvanometer, and to permit operation of the galvanometer in any location without special precautions. Such a suspension inherently subjects the rotatable coil to a restraining torque too great to permit the use of such galvanometers where high sensitivity is desired. In order to make the galvanometer responsive to very small currents, I compensate for the restraining torque of the suspension by providing a counteracting torque, which reverses in direction at substantially the position of the rotatable element which is its nuetral position when acted upon only by the restraining torque of the suspension. This counteracting or compensating torque is obtained by means of a small high-coercive-force magnet mechanically connected to the coil of the galvanometer and acted upon by a magnetic field. For direct-current galvanometers, having field magnets, I provide a pair of magnetic field- or flux-directing wings for concentrating sufficient stray flux of the field magnets upon the small permanent magnet to exert a torque on the permanent magnet, which acts in opposition to the restraining torque of the galvanometer suspension, thus having a negative torque gradient.

I have found my restraining torque mechanism to be particularly useful in the permanent-magnet type of galvanometer and the flux meter which I am about to describe in detail. However, this part of my invention is not limited in its application to use with the other parts of my invention, all of which are described with particularity by way of illustration. For example, I have found the permanent-magnet restraining-torque-compensation mechanism to be valuable also in ratio-meters where restraining torque is undesirable, in electrostatic galvanometers, and in A.-C. galvanometers. A separate stationary magnet for producing the magnetic field to cooperate with the torque-compensating magnet is provided in instruments which do not already have field magnets, from which the stray flux may be utilized.

A better understanding of my invention will be afforded by the following detailed description considered in connection with the accompanying drawing and those features of the invention which are believed to be novel and patentable will be pointed out in the claims appended hereto. In the drawing, Fig. 1 is a schematic diagram representing a flux meter forming an embodiment of my invention. Fig. 2 is an elevation partially in section of the galvanometer of the flux meter, schematically represented in Fig. 1. Fig. 3 is a longitudinal section of the galvanometer cut by the plane 3—3' of Fig. 2, and Fig. 4 is a cross-section cut by the plane 4—4' of Fig. 3. Like reference characters are utilized throughout the drawing to designate like parts.

Flux meters of the Grassot type consist of a search coil in which electromotive force is induced when the coil is moved into a position containing flux, or when the flux, in the position of the coil, is changed as by inserting or withdrawing a permanent magnet or by energizing or deenergizing a solenoid coil. The Grassot flux meter includes, also, a galvanometer which in practice is similar in construction to the ballistic type of galvanometer, but theoretically should have no inertia and should have no restraining torque. Theoretically, the change of flux lines through the pick-up coil induces electromotive force, which tends to react upon the movable coil of the galvanometer, causing it to deflect sufficiently to cut a number of flux lines of the galvanometer field magnet which will induce electromotive force equal and opposite to that induced in the pick-up coil. Accordingly, the angular deflection of the galvanometer coil from any initial position would represent the magnitude of the flux lines, which have cut the search coil. However, if the coil mounting or suspension exerts an excessive restraining torque, its period of vibration becomes too short in relation to the time duration of the flux change measured to produce a correct reading. The reading does not continuously follow changes in flux. Instead, the instrument is made to respond to current impulses. Only the maximum deflection has any significance. The pointer returns to zero instead of holding its deflection until another change in flux occurs. Such a characteristic is objectionable in two ways. The flux change to be measured must be completed before the instrument has begun to deflect, so that slow flux changes cannot be measured, nor can separate measurements be made of flux changes which follow one after another. Secondly, in order to catch the maximum deflection, the reading must be made too quickly to permit precise reading. Accordingly, it is an object of my invention to provide a flux meter, by which prompt and continuous accurate readings will be produced, in which the deflection will be retained for a reasonably long period of time to insure ease of reading, and which any tendency to drift is reduced to a minimum.

As illustrated in Fig. 1 of the drawing, the flux meter comprises a search coil 11, a rotatable current-conducting coil 12 electrically connected to the search coil 11 by leads 13, permanent-magnet field-producing means for cooperating with the current-conducting coil 12 having pole pieces 14 and 15, a compensating-torque permanent magnet 16, a pair of L-shaped flux directing wings 17 and 18, and an adjustable support 19 for the flux-directing wings 17 and 18. As will be explained more in detail hereinafter, the rotatable coil 12 has the compensating torque magnet 16 mechanically connected to it. The coil 12 has mechanically connected to it also suitable means such as a mirror 20 cooperating with a light source, not shown, for producing a light beam deflecting in response to the rotation of the coil 12 to give indications of the measured quantity.

The rotatable coil 12, together with the field-producing means and the torque-compensating means constitutes a galvanometer, which is illustrated more in detail in Figs. 2, 3, and 4. The galvanometer illustrated is composed of an outer or magnet unit 9 and an inner or removable unit 10, each a complete assembly in itself.

The removable unit 10 consists of the moving system, a magnetic core and their supports. The coil 12, in the form of galvanometer illustrated, is suspended within the removable unit 10 or supporting member by means of a marine type of torsion suspension consisting of wires 22 and 23, each secured at one end to the coil 12 and connected electrically and mechanically at the other end to a resilient mounting such as a leaf spring 24. The main supporting structure consists of a pair of longitudinal strips 21 having the shape of segments of a hollow cylinder and composed of insulating material such as phenolic condensation product. The removable unit 10 includes also circular cup-like members 25 and 26, at least one of which; for example, the latter is rotatably mounted within the removable unit 10. The springs 24 are secured and electrically connected to the members 25 and 26. In the arrangement illustrated the strips 21 are screwed to the member 25 at the upper ends and are screwed at the lower ends to a ring 26', within which the member 26 is supported with freedom to be rotated. Any suitable suspension may be employed. I have obtained satisfactory results by the employment of a rectangular cross-section 14-karat gold wire, which is rolled from a wire one and one-half mils in diameter, has a breaking strength of 120 grams, and provides a torsion of 1.2 dyne-centimeters per centimeter. Since the movable armature or coil 12 weighs only 1.2 grams, the apparatus has a high factor of safety with great ability to withstand shock. The gold suspension wires 22 and 23 are electrically connected to the coil 12 to serve, also, as lead-in wires. In order that an electrical circuit to the rotatable coil may be completed, a contact strip 27, composed of a suitable metal such as copper or brass, is secured to one side of the upper end of one longitudinal strip 21 and is electrically connected with the member 25 by means of a screw 28; and a lengthwise-running contact strip 29 is provided, which is electrically connected at the lower end of the other strip 21 by means of a screw 30 to the member 26. The strips 21 are recessed to receive the contact strips 27 and 29. Contact springs 31 and 32, electrically connected to terminal studs 33, are provided in the outer galvanometer unit 9 and are so arranged that the contact strips 27 and 29 will make contact with the springs 31 and 32 when the removable member 10 is mounted in place as shown in the drawing.

Secured to the lower end of the current-conducting coil 12 is a light rod of suitable composition such as aluminum tubing 34 and the torque compensating magnet 16 is carried at the lower end of the rod 34 in order to remove the magnet 16 from the immediate influence of the principal magnetic field of the galvanometer. In the case of a galvanometer with the previously described 1½ mil suspension, the high-coercive-force permanent magnet 16 need be only .075" x .006" x .020". A suitable composition for the magnet 16 is 24% cobalt, 8% aluminum, about 3% copper, 13% nickel and the balance iron, magnetized hot and aged after hot magnetization for about four hours at a somewhat lower temperature without magnetic field. However, other high-coercive force materials may be employed. Secured to the current-conducting coil 12 is, also, a suitable deflection-indicating device, in this case shown as the light-reflecting mirror 20 carried at the upper end of a light brass strip 36, which is secured to the upper end of the current-conducting coil 12. To increase the sensitivity of the galvanometer by minimizing the magnetic reluctance of the magnetic circuit, a soft iron core 37 is secured to the longitudinal strips 21 within the coil 12. Stops 38 for preventing excessive deflection of the coil 12 may, also, be provided if desired. If desired, a cap 39, serving as a zero-adjusting knob may also be secured to the lower cup-like member 26.

For providing a unidirectional magnetic field cooperating with the deflecting current-conducting coil 12, permanent magnet means are provided consisting of a pair of bar magnets 40 and 41 making magnetic contact with the pole pieces 14 and 15. Together with suitable supporting and enclosing members the bar magnets and pole pieces form the outer galvanometer unit 9, which serves as an external housing and support for the galvanometer. The outer unit 9 includes a flanged supporting member 42, an upper enclosing shell 43, a dust cap 44, and a sleeve 45. The shell 43 is composed of a suitable insulating material such as a synthetic plastic, and carries the terminal studs 33 and the contact springs 31 and 32, which are made stiff enough to hold the removable unit 10 within the outer galvanometer unit by frictional engagement. The flanged member 42 is adapted to be bolted to supporting brackets (not shown). It is composed of non-magnetic material such as brass or a non-metallic plastic, e. g. and fastens together the magnets 40 and 41 and the pole-pieces 14 and 15 by means of machine screws. The shell 43 is also fastened to the magnets and pole-pieces. The sleeve 45 extending downwardly from the flanged member 42, serves as a lower closure.

The mechanism for directing magnetic flux to the torque-compensating magnet 16 and for adjustment of the compensating torque, is secured to the removable unit 10 at the lower end thereof. As shown in Fig. 4 spaces 46 are provided between the strips 21 for the flux directing wing members 17 and 18. The ring 19 is internally recessed to fit over and around a supporting ring 47 which holds it against the lower end of the sleeve 45. The ring 47 is secured to the strips 21 by screws 47' (Fig. 4). The flux-directing members 17 and 18 are secured to the ring 19 by means of screws 48 as shown in Fig. 2. The ring 19 is externally threaded to carry an internally threaded ring 49 composed of a suitable permeable magnetic material such as soft-iron or cold rolled steel. Thus the axial position of the ring 49 may be adjusted by rotation thereof to bring it closer or further from the wing members 17 and 18 for shunting more or less of magnetic flux thereof. For locking the shunting ring 49, a second internally threaded ring 50 may be provided and this may be composed of brass, steel or any other material of adequate strength. A third internally threaded ring 51 riveted to a plate 52 serves for clamping the ring 19 against the ring 47 when the desired angular adjustment of the wings 17 and 18 has been made.

The casing member or shell 43 is provided with a window 53, preferably closed with a transparent plate such as glass to permit a beam of light from a light source, not shown, striking the mirror 20 to be reflected against suitable indicating or recording means such as a translucent scale plate or screen or a moving photographic film for oscillography. If desired the galvanometer shown in Figs. 2 and 3 may be used in conjunction with a photoelectric follow-up system and form the basic element of a photoelectric recorder such as that shown in Patent No. 1,897,850, La Pierre, in which the mirror 22 would correspond to the mirror 20 of my application.

The flux-directing wing members have pole pieces 54 and 55 which may, if desired, be turned upwards at right angles in order to increase the volume of the region in which the compensating torque magnet 16 may be effective. The flux-directing wing members 17 and 18 have radially extending wings 56 and 57 adapted to pick up and direct stray flux from the bar magnets 41 and 42 between the pole pieces 54 and 55. Thus the direction of this flux is transverse to the suspension wire 23, which lies along the axis of rotation of the rotatable coil 12. The flux directing wing members 17 and 18 are composed of relatively permeable magnet material such as cold-rolled steel and the ring 19 is composed of a non-magnetic material such as brass. The elements 39, 47, 50, 51 and 52 may be composed of any desired material of sufficient strength whether or not magnetic or electrically conducting.

The flux between the pole pieces 54 and 55 tends to react with the permanent magnet 16 causing it to take up a direction parallel to the flux but with the pole pieces of the magnet 16 extending towards the pole pieces of unlike polarity of the wing members 17 and 18. However, as shown in Figs. 1 and 2, the ring 19 occupies the approximate angular position in which like poles of the magnet 16 and the wing members 17 and 18 are adjacent, when the rotatable coil 12 is in its neutral position, i. e., in a position in which the restraining torque of the wires 22 and 23 is zero or is a minimum. In other words the magnet 16 is in "dead-center" in the opposing flux between the pole pieces 54 and 55 when the coil suspension exerts no torque upon it. It will be understood that the zero or neutral position of the movable element is adjusted by rotating the cap or knob 39 which is secured to the member 26 fastened to the lower end of the suspension wire 23. The flux directing members producing the flux issuing from the pole pieces 54 and 55 constitute one unit and the permanent magnet 16 constitutes the other unit of a pair of mutually repulsing units having a repulsive force acting radially along a line parallel to the permanent magnet 16 through the pole pieces 54 and 55 and perpendicular to the rod 23 and the axis of rotation of the coil 12 when the coil 12 is substantially in the zero position. The zero position of the coil ordinarily coincides with the zero or neutral position of the fillar suspension at which the angular direction of the restraining force produced by the fillar suspension reverses.

To adjust the compensation of restraining torque, wing members 17 and 18 are brought to the proper angular position by rotating the ring 19. The exact angular position for best results depends upon the degree of symmetry of the magnetic fields and whether or not there are any hard spots or other irregularities in any of the magnetic flux conducting members. The strength of the magnetic field crossing between the pole pieces 54 and 55 of the flux-directing members is adjusted by rotation of the ring 49 until sufficient flux is shunted away from the pole pieces 54 and 55. The proper adjustment is such as to provide a flux strength reacting upon the permanent magnet 16, which will compensate for the restraining torque of the suspension wires 22 and 23. Theoretically, the variation in compensating torque of the permanent magnet 16 with rotation of the coil 12 will very nearly follow a sine law, increasing with angular deflection from the neutral position, and the restraining torque from the suspension wires 22 and 23 will follow a straight line law from the neutral position. In practice I have found, however, that both the restraining torque and compensating torque follow substantially a straight line law and the restraining torque is sufficiently compensated throughout the angular range of the instrument. It will be understood that such instruments are not ordinarily operated throughout a wide angular range so that even the theoretical deviation between the straight line law and the sine law is very small. The compensation-adjusting ring 49 may be used both for varying the galvanometer sensitivity to suit requirements, and for adjusting the apparatus to an absolute maximum of sensitivity in which the restraining torque is compensated as closely as it is possible to do without allowing the compensating torque to exceed the restraining torque at any point. Thus, by means of this adjustment a galvanometer of an adjustable sensitivity is provided, which has undiminished sturdiness for any sensitivity adjustment.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A fluxmeter comprising a search coil adapted to be placed in a position where flux is to be measured, a movable coil, leads electrically connecting the search coil and the movable coil, means producing a fixed magnetic field in which the movable coil is adapted to move, resilient supporting means for the movable coil subjecting said coil to an inherent restraining force increasing with movement of the coil in either direction from a position called a zero position, an auxiliary means for applying an opposing force to said movable coil for substantially canceling the restraining force of the coil supporting means, whereby the movable coil takes up a position dependent upon the flux change in the pick-up coil and tendency to drift is minimized, said auxiliary means comprising a permanent magnet mechanically connected to the movable coil and extending perpendicular to the direction of movement of the movable coil, and a stationary member for producing a magnetic field applying a repulsive force to the permanent magnet acting lengthwise of the permanent magnet when it is in the position corresponding to the zero position of the movable coil.

2. A sturdy sensitive galvanometer comprising an element movable in response to a quantity to be measured or indicated, a resilient support for the movable element inherently subjecting the movable element to some restraining force which reverses at a zero or neutral position of the movable element, means for subjecting the movable element to a counteracting auxiliary force changing in direction at substantially the same position of the movable element as the restraining force for substantially canceling the restraining force, said means comprising a pair of relatively rotatable members one of which is mechanically connected to the said movable element of the galvanometer, said relatively rotatable members comprising a permanent magnet extending transverse to the axis of rotation of the relatively rotatable members and a device for directing the magnetic flux through the permanent magnet in a direction opposite to the direction of the flux produced by the permanent magnet when it is in the angular position corresponding to said zero or neutral position of the movable element.

3. A galvanometer with a rotatable element, a resilient support for the rotatable element inherently subjecting the same to some restraining force, a permanent magnet mechanically connected to the movable element in proximity to its axis of rotation and having a magnetic axis transverse to the axis of rotation and means for directing a unidirectional magnetic flux transverse to the axis of rotation of the rotatable element in proximity to the said permanent magnet, said unidirectional flux having such orientation that the polarity of the permanent magnet opposes said magnetic flux and said permanent magnet is substantially in dead center with respect to rotation when the rotatable element is at the neutral position of zero or minimum restraining force.

4. A galvanometer of the type set forth in claim 3 including an adjustably mounted shunting member composed of relatively permeable magnetic material in proximity to the flux directing means for adjustment of the strength thereof by adjustment of the amount of flux shunted.

5. A galvanometer comprising unidirectional magnetic field producing means, a current-conducting coil adapted to rotate within the magnetic field of said means and react therewith to deflect in response to current flow in the coil, resilient supporting means for the coil inherently subjecting it to restraining torque, a relatively small light permanent magnet composed of high coercive force magnetic material mechanically connected to the rotatable coil in proximity to its axis of rotation and having its magnetic axis extending transverse to the axis of rotation of the coil, and flux directing wing means composed of relatively permeable magnetic material directing a portion of the stray field from said unidirectional magnetic field producing means across the axis of said rotatable coil adjacent to said permanent magnet and so oriented as to produce a magnetic field in direct opposition to the polarity of the permanent magnet when the rotatable coil is substantially in the neutral position with respect to the restraining torque of its supporting means.

6. A galvanometer such as specified in claim 5 with a rotatable support for the flux-directing wing means having an axis of rotation substantially coaxial with the axis of rotation of the rotatable element.

7. A galvanometer such as specified in claim 5 with a magnetic shunt composed of relatively permeable magnetic material adjustably supported in proximity to the flux-directing wing means for varying the strength of flux directed by said wing means in accordance with the position of the adjusting shunt.

8. A galvanometer comprising a supporting member, a suspension extending substantially coaxially within said supporting member, a rotatable current conducting coil secured approximately midway in said supporting member to said suspension, whereby it is adapted to rotate against the inherent restraining torque of said suspension, permanent magnet field producing means secured to said supporting member around said rotatable coil, a relatively small light permanent magnet composed of high coercive force magnetic material mechanically connected to said rotatable coil at an appreciable distance therefrom so as to be out of the immediate region of influence of said permanent magnetic means, a member secured to said supporting member in the vicinity of said permanent magnet and rotatable about the axis of rotation of said rotatable coil, said rotatable member carrying a pair of radially extending magnetic flux-directing wings having pole pieces adjacent said permanent magnet for directing stray flux from the permanent magnet field producing means across the axis of rotation of the rotatable coil at the location of the permanent magnet in order to produce a magnetic force substantially canceling the restraining torque of the suspension, and a ring supported below said wings adjustable in axial position for adjustably shunting a portion of the flux passing through said wings for adjusting the compensation of the restraining torque.

9. A sturdy sensitive galvanometer comprising an element movable in response to a quantity to be measured or indicated, a resilient support for the movable element inherently subjecting the movable element to some restraining force which reverses at a zero or neutral position of the movable element, auxiliary means for subjecting the movable element to a counteracting force changing in direction at substantially the same position of the movable element as the restraining force for substantially canceling the restraining force, said auxiliary means comprising a pair of mutually repulsing units mounted relatively rotatable, one of which is mechanically connected to said movable element of the galvanometer, the other of said repulsing units being aligned to produce repulsive force between said mutually repulsing units acting through the axis of rotation thereof along the length of the rotatable unit whereby the angular direction of torque produced by the repulsive force reverses at said zero or neutral position.

THEODORE A. RICH.